US006928465B2

(12) United States Patent
Earnest

(10) Patent No.: US 6,928,465 B2
(45) Date of Patent: Aug. 9, 2005

(54) REDUNDANT EMAIL ADDRESS DETECTION AND CAPTURE SYSTEM

(75) Inventor: Jerry Brett Earnest, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 818 days.

(21) Appl. No.: 09/810,158

(22) Filed: Mar. 16, 2001

(65) Prior Publication Data

US 2002/0184315 A1 Dec. 5, 2002

(51) Int. Cl.[7] .............................................. G06F 15/16
(52) U.S. Cl. ....................................................... 709/206
(58) Field of Search .............................. 709/206; 707/5, 707/10; 713/201

(56) References Cited

U.S. PATENT DOCUMENTS

| | | | |
|---|---|---|---|
| 5,742,769 A | 4/1998 | Lee et al. ............... 395/200.36 |
| 5,826,269 A | 10/1998 | Hussey ......................... 707/10 |
| 5,832,208 A | * 11/1998 | Chen et al. .................. 713/201 |
| 5,859,967 A | 1/1999 | Kaufeld et al. ............. 395/186 |
| 5,864,871 A | 1/1999 | Kitain et al. ................ 707/104 |
| 5,884,033 A | 3/1999 | Duvall et al. ........... 395/200.36 |
| 5,949,876 A | 9/1999 | Ginter et al. .................... 380/4 |
| 5,968,176 A | 10/1999 | Nessett et al. .............. 713/201 |
| 5,982,891 A | 11/1999 | Ginter et al. .................... 380/4 |
| 6,012,066 A | 1/2000 | Discount et al. ............. 707/103 |
| 6,023,723 A | 2/2000 | McCormick et al. ........ 709/206 |
| 6,026,440 A | 2/2000 | Shrader et al. .............. 709/224 |
| 6,038,601 A | 3/2000 | Lambert et al. ............. 709/226 |
| 6,052,812 A | 4/2000 | Chen et al. .................. 714/751 |
| 6,065,055 A | 5/2000 | Hughes et al. .............. 709/220 |
| 6,073,119 A | 6/2000 | Bornemisza-Wahr et al. . 705/42 |
| 6,073,167 A | 6/2000 | Poulton et al. .............. 709/206 |
| 6,088,696 A | * 7/2000 | Moon et al. .................. 707/10 |
| 6,105,027 A | 8/2000 | Schneider et al. ............. 707/9 |
| 6,108,691 A | 8/2000 | Lee et al. .................... 709/206 |
| 6,115,455 A | 9/2000 | Picard ........................ 379/67.1 |
| 6,115,709 A | 9/2000 | Gilmour ......................... 707/9 |
| 6,122,632 A | 9/2000 | Botts et al. ................... 707/10 |
| 6,147,975 A | 11/2000 | Bowman-Amuah ......... 370/252 |
| 6,154,783 A | 11/2000 | Gilmour et al. ............. 709/245 |
| 6,157,935 A | 12/2000 | Tran et al. ................... 707/503 |
| 6,161,130 A | * 12/2000 | Horvitz et al. .............. 709/206 |
| 6,199,103 B1 | 3/2001 | Sakaguchi et al. .......... 709/206 |
| 6,266,664 B1 | * 7/2001 | Russell-Falla et al. ......... 707/5 |
| 6,321,222 B1 | * 11/2001 | William Soderstrom et al. ............................. 707/5 |
| 6,330,590 B1 | 12/2001 | Cotton ....................... 709/206 |
| 6,643,686 B1 | * 11/2003 | Hall ........................... 709/206 |
| 6,654,787 B1 | * 11/2003 | Aronson et al. ............ 709/206 |
| 6,675,161 B1 | * 1/2004 | Suchter ......................... 707/5 |
| 6,732,149 B1 | * 5/2004 | Kephart ...................... 709/206 |

FOREIGN PATENT DOCUMENTS

| | | | |
|---|---|---|---|
| EP | 974 917 | 1/2000 | ........... G06F/17/60 |

OTHER PUBLICATIONS

Michel, Sam; When Marketing Becomes Spam; Nov. 2000; New Media Age 20.

* cited by examiner

Primary Examiner—John Follansbee
Assistant Examiner—Jungwon Chang
(74) Attorney, Agent, or Firm—Michael A. Glenn; Glenn Patent Group

(57) ABSTRACT

A mechanism for automatically detecting such unwanted messages in real time, which is referred to herein as the Redundant Email Address Detection And Capture System (READACS) is disclosed. The READACS program assumes that incoming mail files have been written to disk in a file format that is somewhat consistent and/or predictable by the programmer. The task of READACS is to identify those email message files, locate an address-of-origin within those files, identify whether the email message should be considered spam, separate spam and non-spam email messages logically, and physically move or rename (or both) those email messages as desired by the programmer.

3 Claims, 4 Drawing Sheets

REDUNDANT EMAIL ADDRESS DETECTION AND CAPTURE SYSTEM

BACKGROUND OF THE INVENTION

1. Technical Field

The invention relates to electronic messaging. More particularly, the invention relates to a redundant email address detection and capture system.

2. Description of the Prior Art

Electronic messaging systems;, such as email, are now commonly accepted and in widespread use. While such systems are provided to facilitate the exchange of information between parties desiring such intercourse, many interlopers exploit the openness of these systems to send spurious messages of a commercial or harassing nature. Such messages are commonly referred to as "spam" (see, for example, S. Michel, *When marketing becomes spam,* New Media Age, 20 (Nov. 30, 2000). The volume of spam is so great that, in many cases, one has to wade through dozens of worthless messages and systems administrators are often confronted with excessive demands on system capacity and throughput just to process spam.

Some approaches to solving the problem of receiving unsolicited and unwanted messages include the following:

Techniques for Eliminating Redundant Access Checking By Access Filters, U.S. Pat. No. 6,105,027; Distribution Limiter for Network Messaging, U.S. Pat. No. 6,073,167; Inappropriate Site Management Software, U.S. Pat. No. 6,065,055; Internet Filtering System for Filtering Data Transferred Over the Internet Utilizing Immediate and Deferred Filtering Actions, U.S. Pat. No. 5,884,033; *Block Junk E-mail; PC/Computing;* v11, n11, p156 (November 1998); *CyberPR Cutting Spam Out of Your Diet With Email Filters;* INTERACTIVE PR & MARKETING NEWS; v6, i2 (Jan. 22, 1999); and *Simple Software Commands Allow Users to Tame Unwanted Email;* PR News; v54, i47 (Nov. 30, 1998).

Such techniques typically involve the use of filters that identify which particular messages are permitted or that are not permitted by checking lists of accepted or forbidden senders and/or subjects. A limitation with this approach is that the lists must be maintained or the filter becomes less effective with time because many 'spammers' are sophisticated and often change their identity to thwart such systems. It would therefore be advantage to provide a mechanism for automatically detecting such unwanted messages in real time.

SUMMARY OF THE INVENTION

The invention provides a mechanism for automatically detecting such unwanted messages in real time, which is referred to herein as the Redundant Email Address Detection And Capture System (READACS). The READACS system assumes that incoming mail files have been written to a disk in a file format that is somewhat consistent and/or predictable by the programmer. The task of READACS is to identify those email message files, locate an address-of-origin within those files, identify whether the email message should be considered spam, separate spam and non-spam email messages logically, and physically move or rename (or both) those email messages as desired by the programmer.

DETAILED DESCRIPTION OF THE INVENTION

The invention provides a mechanism for automatically detecting such unwanted messages in real time, which is referred to herein as the Redundant Email Address Detection And Capture System (READACS). The READACS program assumes that incoming mail files have been written to disk in a file format that is somewhat consistent and/or predictable by the programmer. The task of READACS is to identify those email message files, locate an address-of-origin within those files, identify whether the email message should be considered spam, separate spam and non-spam email messages logically, and physically move or rename (or both) those email messages as desired by the programmer.

Operation

Figure 1A:
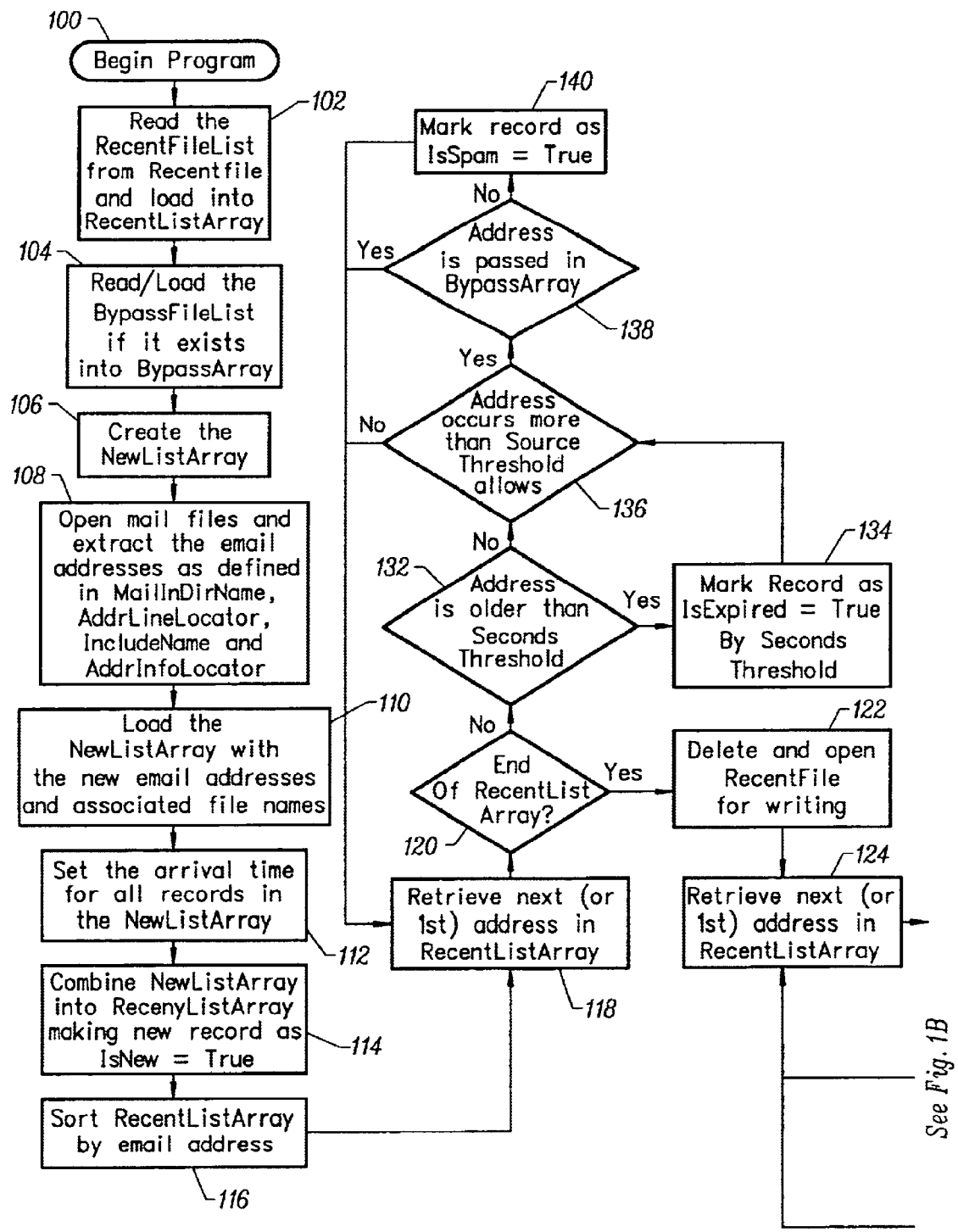
FIG. 1 is a flow diagram showing operation of the READACS program according to a presently preferred embodiment of the invention.
Figure 1B:
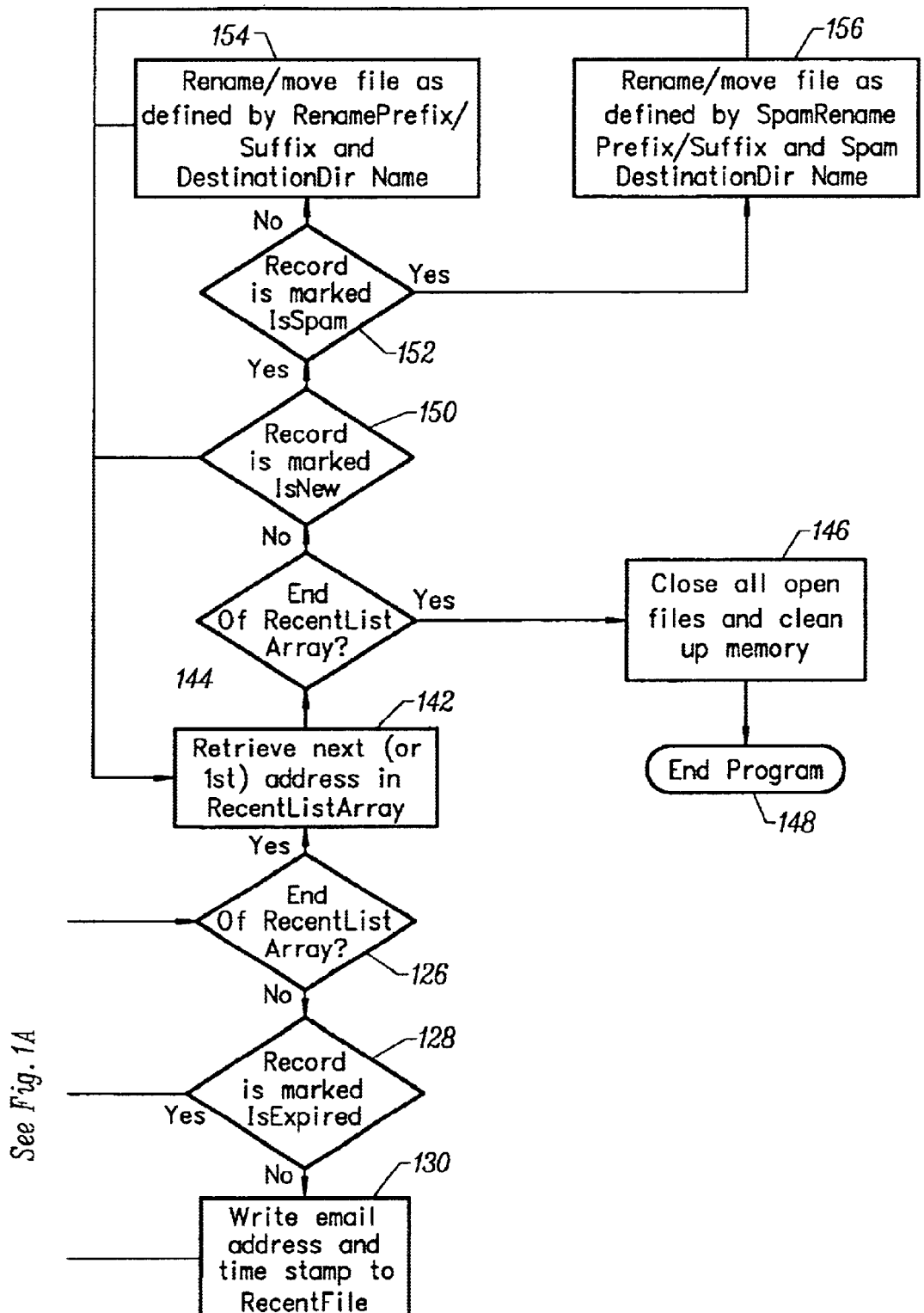

FIG. 1 is a flow diagram showing operation of the READACS program according to a presently preferred embodiment of the invention. While an exemplary program flow is shown in connection with FIG. 1, those skilled in the art will appreciate that the invention is readily implemented with other process flows, and that more or fewer steps and different sequences of steps may be used to implement the invention. The various defined terms in the immediately following discussion are also discussed in greater detail further below.

When the program begins execution (100) a RecentFileList is read from a RecentFile and loaded into a RecentListArray (102). If a BypassFileList is included, it is read into a BypassArray (104). The system then creates a NewListArray (106). The system opens mail files and extracts the email addresses of the sender as defined in MailInDirName, AddrLineLocator, and AddrInfoLocator fields (108). The system then loads the NewListArray with the new email addresses and the associated file names (110). An arrival time is set for all records in the NewListArray (112) and the NewListArray is combined into the RecentListArray, marking new records as IsNew=True (114). The RecentListArray is then sorted by email addresses (116).

The program then examines the email messages to identify spam. A loop is entered in which each address in the RecentListArray is retrieved, one at a time (118). Those skilled in the art will appreciate that the actual processing of messages may occur in parallel.

If the end of the RecentList Array is reached (120), then the Recent ListArray is deleted and a RecentFile is opened for writing (122). A next (or first) address in the RecentListArray is then retrieved (124) and a determination is made if the end of the RecentList Array is reached (126). If not, the record is examined to determine if it is marked as IsExpired (128) and if so, program flow returns to retrieve the next address in the RecentListArray (124). If not, the email address and a corresponding time stamp are written to the RecentFile (130), and then program flow returns to retrieve the next address in the RecentListArray (124).

If the end of the RecentList Array is not reached (120), then the system retrieves the next (or first) address in the RecentListArray (142) and a determination is made if the end of the RecentList Array is reached (144). If yes, all open file are closed and memory is cleaned up (146). This ends execution of the program (148). If not, a determination is made if the record is marked as IsNew (150). If not, a next record is retrieved (142) and program execution continues as indicated. If yes, the record is checked to determine if it is marked as IsSpam (see below) (152). If yes, the record is renamed and/or removed as defined by a SpamRenamePrefix/Suffix and a SpamDestinationDirName (156), and a next record is retrieved (142) and program execution continues as indicated. If not, the record is renamed/removed as defined by a RenamePrefix/Suffix and a DestinationDirName, and a next record is retrieved (142) and program execution continues as indicated.

Spam is determined as follows: When an address is retrieved from the RecentListArray (118) and the end of the array has not been reached (120) the age of the address is determined based upon a SecondsThreshold (132). If the message is older than the threshold, then the record is marked as IsExpired=True by Seconds Threshold (134). In either event, a determination is made whether the address occurs more often than the SourceThreshold allows (136). If not, another record is retrieved and examined (118). If yes, the address is examined to see if it is to be passed anyway because it is identified in the BypassArray (130). If yes, then another record is retrieved and examined (118). If the message exceeds the SourceThreshold and the SecondThreshold has not timed out, and if the record is not listed in the BypassArray, then the record is marked as IsSpam=True (140) and another record is retrieved and examined (118) until the RecentList Array is entirely processed, at which point program execution proceeds as discussed above.

Figure 2:
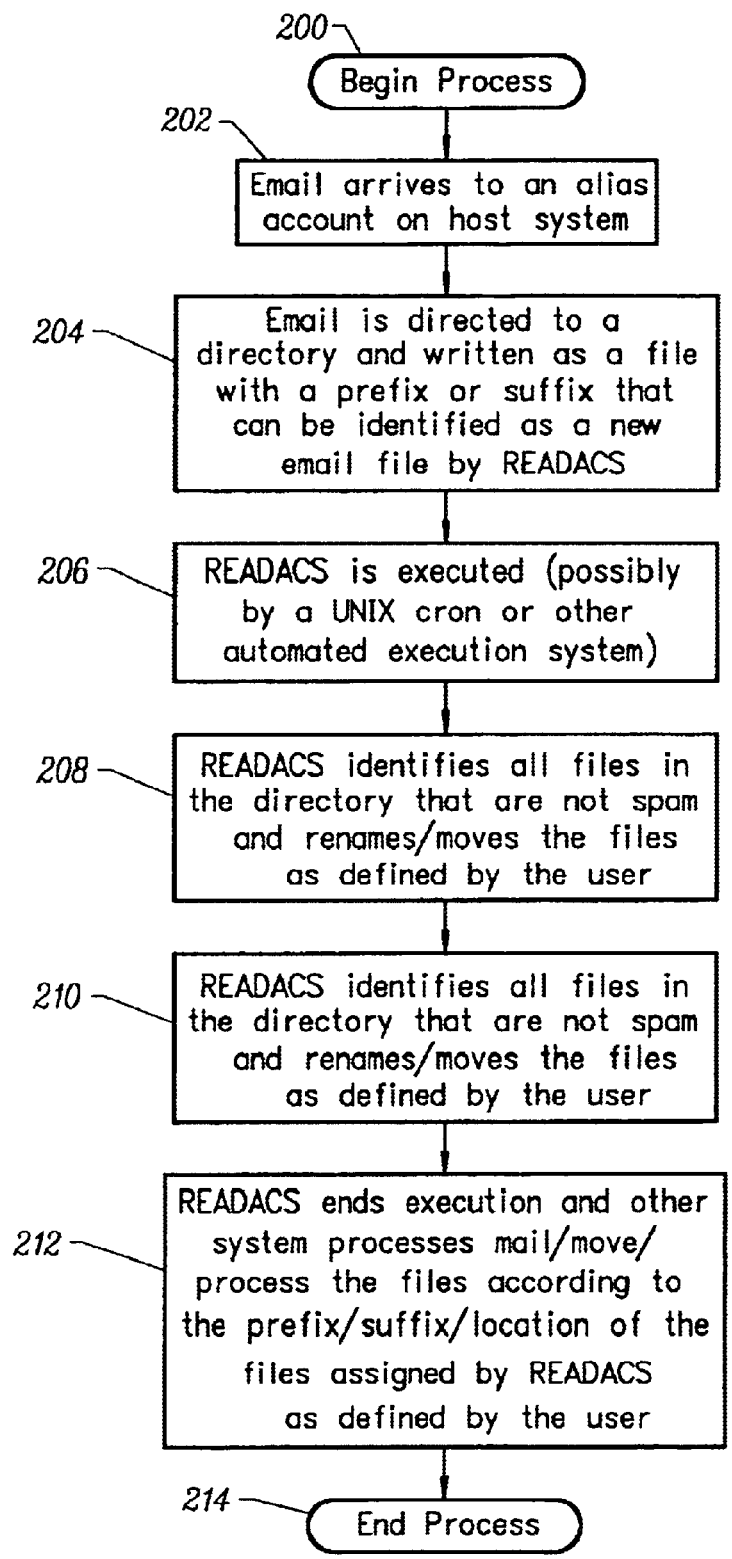
FIG. 2 is a flow diagram showing operation of the READACS program in connection with the processing of email according to a presently preferred embodiment of the invention.

FIG. 2 is a flow diagram showing operation of the READACS program in connection with the processing of email according to a presently preferred embodiment of the invention. While an exemplary process flow is shown in connection with FIG. 2, those skilled in the art will appreciate that the invention is readily implemented with other process flows, and that more or fewer steps and different sequences of steps may be used to implement the invention. The various defined terms in the immediately following discussion are also discussed in greater detail further below.

When the process begins (200) an email arrives at an alias account of a host system (202). The email is routed to a directory and written as a file having a prefix and/or suffix that allows it to be identified as a new email by the READACS system (204). The READACS program is executed (as discussed above in connection with FIG. 1), for example by a UNIX cron or other automated execution system (206). The READCS program identifies all files in the directory that are spam and renames/moves the files, as defined by the user (208). For example, the files may be deleted or they may be cached for review and/or analysis. The READACS program then identifies all files in the directory that are not spam and renames/moves the files, as defined by the user (210). For example, the files may be routed to the intended recipient or they may be filtered and further routed to an appropriate department. The READACS program then ends execution and other system processes mail/move/process the files according to the prefix/suffix location of the files assigned by the READACS program, as defined by the user (212). This ends the process (214).

Figure 3:
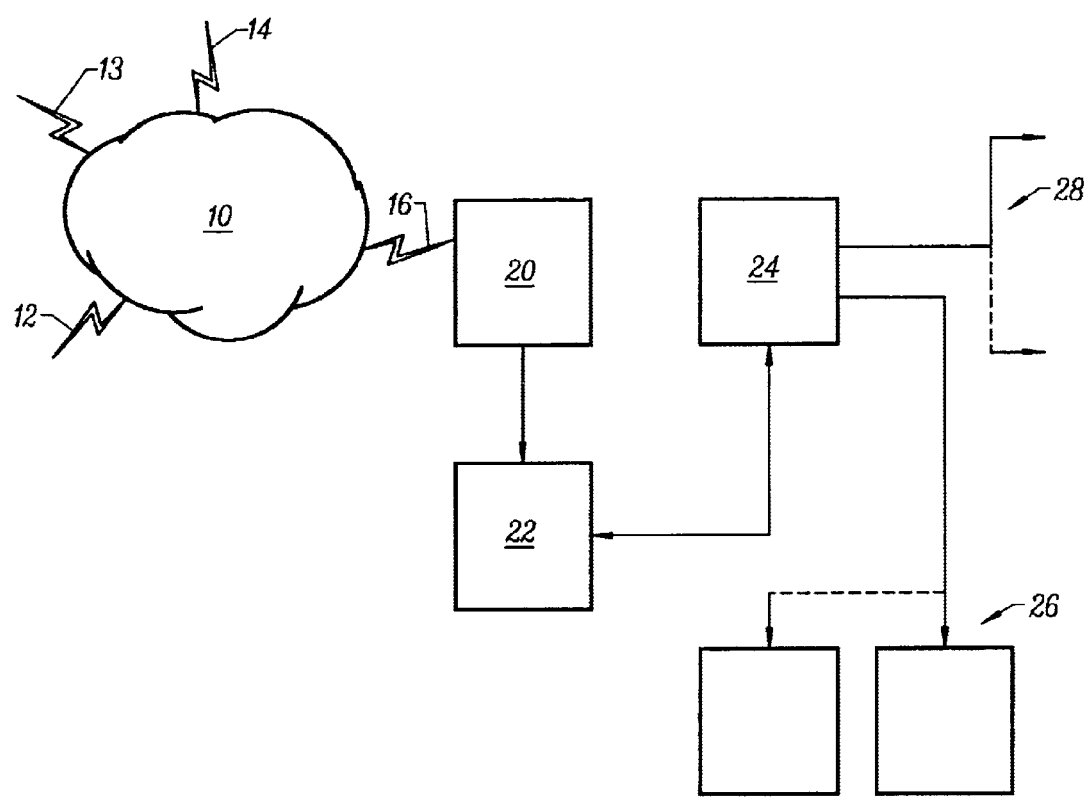
FIG. 3 is a block schematic diagram showing an email system that incorporates the READACS program according to a presently preferred embodiment of the invention.

FIG. 3 is a block schematic diagram that shows an email system the incorporate the READACS program according to a presently preferred embodiment of the invention. In such system, messages are originated by various sending entities 12–14 and routed via a public network, such as the Internet 10, to a destination mail server 20. At the mail server, the newly arrived messages are identified and routed to a directory 22. The READACS program 24 is invoked (as described above), and the messages in the directory are examined and classified as spam or non-spam. Non-spam messages are routed to their appropriate destinations 28 in accordance with routing instructions established by the system operator, as is well known in the art. Spam is sent to one or more predetermined destinations 26. For example, some spam may be deleted upon detection, while other spam may be routed to various departments for further analysis. In this way, messages that are identified as spam but that are not truly spam may be saved and, if determined to be valid messages, they may be delivered at a later time. This assures that such messages are not inadvertently deleted. Further, threatening or harassing messages or persistent spam may be routed to a department that investigates such messages, for example ion view of legal action to be taken against the sender.

A Scenario

Company A receives email from a variety of sources. Some of the email is formatted in a specific manner, other email is free-form. Email arrives via alias processes into several directories, depending upon the route taken by the email.

All email to be processed within the company eventually arrives in a directory (/mail/to_process) and the company mail system only processes files in this directory that have the suffix ".ready" attached. After mail is processed, the mail file is renamed to ".done" and moved to a different directory, indicating that no further processing is to take place on this email file.

Company A determines that it is occasionally being spammed and desires to monitor incoming email and move suspected spam into a directory (/mail/source_<x>_spam) for further review.

The company has the mail directory structure shown in Table A below.

TABLE A

Company A Mail Directory Structure

| Source | Initial Directory | Final Directory | Format |
|---|---|---|---|
| Source_1 | /mail/source_1 | /mail/to_process | unformatted |
| Source_2 | /mail/source_2 | /mail/to_process | formatted |
| Source_3 | /mail/to_process | /mail/to_process | formatted |

Items arriving from Source_1 are normal email messages in the SMTP header format coming from a variety of sources. Items arriving in Source_2 are formatted in a company-specified format but come from a variety of sources. Items arriving in Source_3 are formatted in a company-specified format and come from a combination internal and external sources.

Given the information above, Company A configures READACS as shown in Table B below.

TABLE B

Company A READACS Configuration

| Source | Value |
|---|---|
| Source_1 | |
| SetRecentFile | source_1_history.lst |
| SetBypassFile | source_1_bypass.lst |
| | File contents: |
| | @aol.com,100 |
| | @pacbell.net,300 |

TABLE B-continued

Company A READACS Configuration

| Source | Value |
|---|---|
| SetMailInDirName | /mail/source_1 |
| SetDestinationDirName | /mail/to_process |
| SetRenameSuffix | .ready |
| SetSpamDirName | /mail/source_1_spam |
| SetSpamSuffix | .spam |
| SetAddrLineLocator | From: |
| SetAddrInfoLocator | @ |
| SetSourceThreshold | 10 |
| SetSecondsThreshold | 3600 (one hour) |
| Source_2 | |
| SetRecentFile | source_2_history.lst |
| SetBypassFile | source_2_bypass.lst |
| | File contents: |
| | (empty) |
| SetMailInDirName | /mail/source_2 |
| SetDestinationDirName | /mail/to_process |
| SetRenameSuffix | .ready |
| SetSpamDirName | /mail/source_2_spam |
| SetSpamSuffix | .spam |
| SetAddrLineLocator | X-WFB_CHANNEL_ID |
| SetAddrInfoLocator | @ |
| SetSourceThreshold | 5 |
| SetSecondsThreshold | 7200 (two hours) |
| Source_3 | |
| SetRecentFile | source_3_history.lst |
| SetBypassFile | source_3_bypass.lst |
| | File contents: |
| | Production ID,999999 |
| SetMailInDirName | /mail/to_process |
| SetDestinationDirName | /mail/to_process |
| SetRenameSuffix | .ready |
| SetExcludeName | .ready |
| SetIncludeName | wf_ |
| SetSpamDirName | /mail/source_3_spam |
| SetSpamSuffix | .spam |
| SetAddrLineLocator | X-WFB_CHANNEL_ID |
| SetAddrInfoLocator | "" |
| SetSourceThreshold | 10 |
| SetSecondsThreshold | 3600 (one hour) |

The preceding configurations are described as follows:

Source 1 configuration

The history file that is used by READACS to monitor email activity is located in the same directory as the READACS program and is called "source_1_history.lst". The bypass file is located in the same directory as the READACS program and is called "source_1_bypass.lst". This bypass file contains two entries that allow for up to 100 email messages to originate from any address @aol.com within one hour and 300 messages from any originating email address @pacbell.net within an hour to be allowed before marking them as spam (see the discussion of SetSecondsThreshold below for reference to one hour). Look for new incoming mail in the /mail/source_1 directory and, if it is not spam, add a ".ready" suffix to it and move it to the /mail/to_process directory. If any email is identified as spam it should be renamed with a ".spam" suffix and moved to the /mail/source_1_spam directory. When looking at email, the line that contains the email address should contain "From:" and the address includes the "@" sign. Allow up to ten email messages, unless otherwise specified in the bypass file above, from any one email address within an hour (3600 seconds) before marking it as spam.

Source 2 configuration

The history file that is used by READACS to monitor email activity is located in the same directory as the READACS program and is called "source_2_history.lst". The bypass file is located in the same directory as the READACS program and is called "source_2_bypass.lst". This bypass file contains no entries that allow for special handling of particular expected high-volume sources. This means that all mail is subject to the value in SetSourceThreshold. Look for new incoming mail in the /mail/source_2 directory and, if it is not spam, add a ".ready" suffix to it and move it to the /mail/to_process directory. If any email is identified as spam it should be renamed with a ".spam" suffix and moved to the /mail/source_2_spam directory. When looking at email, the line that contains the email address should contain "X-WFB_CHANNEL_ID" and the address includes the "@" sign. Allow up to five email messages from any one email address within two hours (7200 seconds) before marking it as spam.

Source 3 configuration

The history file that is used by READACS to monitor email activity is located in the same directory as the READACS program and is called "source_3_history.lst". The bypass file is located in the same directory as the READACS program and is called "source_3_bypass.lst". This bypass file contains one entry that allows for up to 999999 email messages to originate from any address from "Production ID" within one hour before marking them as spam (see SetSecondsThreshold below for reference to one hour). This means that all mail is subject to the value in SetSourceThreshold. Look for new incoming mail in the /mail/to_process directory and, if it is not spam, add a ".ready" suffix—leaving it in the /mail/to_process directory. If any email is identified as spam it should be renamed with a ".spam" suffix and moved to the /mail/source_3_spam directory. When looking at email, the line that contains the email address should contain "X-WFB_CHANNEL_ID" and the address includes the entire remainder of the line (""). Allow up to ten email messages from any one email address within one hour (3600 seconds) before marking it as spam. Additionally, ONLY process items that begin include a "wf_" in the name and DO NOT process (exclude) any file that contains ".ready" in the file name. This is because 1) there may be other files in the directory that are not really email, i.e. they do not have "wf_" in the name, and 2) Source_1 and Source_2 are placing items into this directory as well, so do not analyze them again, i.e. exclude any file with ".ready" in the file name.

Design

Files to be processed are indicated by path (SetMailInDirName(string)) and whether a particular group of files within that directory are set for inclusion by name (SetIncludeName(string)) or are to be excluded from processing by name (SetExcludeName(string)). If any portion of the file name contains either of the strings specified in the SetIncludeName or SetExcludeName methods the file is included or excluded accordingly. The files that are ultimately processed are searched for an address-of-origin to be analyzed.

An email's address-of-origin is identified by a two-step process:

1) The line on which an email address may reside is identified (SetAddrLineLocator(string)); and
2) the address-of-origin is extracted from the line by searching for an indicator (SetAddrInfoLocator (string)) within the line.

The address-of-origin within the address line is considered to be the first string containing the indicator identified in the SetAddrInfoLocator and bounded by the first space before and after the characters immediately adjacent to the indicator. If no spaces are found for bounding the address, or if no occurrence of the indicator is found the entire line, beginning at the first character past the address line locator and continuing to the end of the line, is returned as the address-of-origin.

When the address-of-origin is obtained it is added to a dynamically-sized internal structure array that carries pertinent information about the file, including the file's name and time of arrival. This array is eventually merged with another structure array that contains more data, e.g. whether the file is new, if the file's time has expired. If no address-of-origin can be found, the file is ignored and no processing, renaming, or moving of the file is performed.

Messages are analyzed and determined to be spam or non-spam through a combination of a time threshold (SetSecondsThreshold(long)), bypass exceptions and tolerances (indicated in the bypass file, SetBypassFile(string)) and a maximum number of allowed messages from any one address (SetSourceThreshold(long)). The bypass file is a text file containing two fields per line:

1) The address to be allowed beyond the value indicated in the SetSourceThreshold method; and
2) The total number of messages to be allowed from this address before considering it to be spam mail.

It is important to know that the number indicated in SetSourceThreshold and the tolerance within the bypass file are bounded within the time frame indicated in the SetSecondsThreshold method. In other words, if SetSecondsThreshold(3600) and SetSourceThreshold(10) are set and there is an entry in the bypass file such as "goofy@isp.com, 100", the user is indicating that the system should allow up to ten messages within any one hour period before marking it as spam. Additionally, if goofy@isp.com sends more than ten messages in any one hour period, further check and allow goofy@isp.com to send up to one hundred messages in any one hour period before marking it as spam. Each object (an instance of the READACS class) can have its own bypass file, or it can be shared.

Information collected from mail files is assimilated into an internal structure array. This array is ultimately sorted by address and the logic described above is applied in determining which array elements are considered spam from those that are non-spam. An item, i.e. message file, within the array that has no address is ignored. Information persistence is accomplished by writing necessary information to the recent file, as indicated by SetRecentFile(string). The recent file is created and maintained by the object to which it belongs and should never be altered by any other process or user. It may be viewed for informational purposes. Note, too, that the size of the recent file is dependent upon the value set in the SetSecondsThreshold method and the amount of mail files processed within that time. As items expire (that is, information received x-seconds ago is greater than the value of SetSecondsThreshold(x)) they are removed from the recent file.

Messages, i.e. the files containing each message, are routed and/or renamed as either spam, as indicated by SetSpamDirName(string) and SetSpamSuffix(string) or non-spam, as indicated by SetDestinationDirName(string) and SetRenameSuffix(string). The original copy is removed from its location that was indicated in the SetMailInDirName method.

Implementation

For unattended operation a READACS object can be executed (Execute()) by a cron cycle. The cyclic rate of calls to the Execute method for an object should be greater than the value set in the SetSecondsThreshold method. That is, if the value provided to SetSecondsThreshold is 1800 (½ hour), then the cron cycle should be executing more often than once per half-hour. Ideally, the cyclic cron rate-to-SetSecondsThreshold value ratio should be high and never fall below one (cron minutes *60/GetSecondsThreshold>= 1).

There may be more than one READACS object within a particular program. As an alternative, a single READACS object may be completely redefined after each call to the Execute method to provide a different behavior each time the object's Execute method is called.

The presently preferred implementation of READACS allows a maximum level of flexibility. The minimum implementation parameters are validated at the invocation of the Execute method. Required parameters are as follows:

1. The path and/or name of the recent file (SetRecentFile).
2. The path and/or name of the bypass file (SetBypassFile).
3. The incoming mail directory (SetMailInDirName).
4. The directory and/or file name suffix for non-spam mail (SetDestinationDirName and SetRenameSuffix).
5. The directory and/or file name suffix for spam mail (SetSpamDirName and SetSpamSuffix).
6. The number of seconds to accumulate information before clearing it (SetSecondsThreshold).
7. The number of occurrences of any one address to allow within the value passed to the SetSecondsThreshold (SetSourceThreshold).
8. The string for which to search within each file processed to determine if this line should contain an address (SetAddrLineLocator); this is normally "From: ". Only the first occurrence of the locator within the file is evaluated.

Optional parameters may be specified as well. The optional parameters are listed here:

1. Partial file names to be excluded from processing (SetExcludeName); any file including the string specified is excluded from processing.
2. Partial file names to be included in processing (SetIncludeName); only files including the string specified is processed.
3. A suffix for processed non-spam files (SetRenameSuffix); only optional if SetDestinationDirName is defined.
4. A destination directory path for non-spam files (SetDestinationDirName); only optional if SetRenameSuffix is defined.
5. A suffix for processed spam files (SetSpamSuffix); only optional if SetSpamDirName is defined.
6. A destination directory path for spam files (SetSpamDirName); only optional if SetSpamSuffix is defined.
7. A string defining what should be considered an address within a line previously identified by the AddrLineLocator above (SetAddrInfoLocator); this is normally an "@" sign and is ultimately evaluated to an address-of-origin bounded by spaces (not included). If SetAddrInfoLocator is not called, or is set to an empty string, the entire line after the value of SetAddrLineLocator is returned.

Care must be taken to be certain that the owner of the execution process has sufficient rights and privileges to all paths and files that are examined and/or processed by READACS.

Table C below is a user interface methods listing.

TABLE C

User Interface Methods Listing

| Return Type | Method | Description |
| --- | --- | --- |
| int | Execute() | Begins processing files as configured. |
| string | GetAddrInfoLocator() | Returns the string value that was set by the SetAddrInfoLocator() method. |
| string | GetAddrLineLocator() | Returns the string value that was set by the SetAddrLineLocator() method. |
| string | GetBypassFile() | Returns the string value that was set by the SetBypassFile() method. |
| string | GetDestinationDirName() | Returns the string value that was set by the SetDestinationDirName() method. |
| string | GetExcludeName() | Returns the string value that was set by the SetExcludeName() method. |
| string | GetIncludeName() | Returns the string value that was set by the SetIncludeName() method. |
| string | GetMailInDirName() | Returns the string value that was set by the SetMailInDirName() method. |
| string | GetRecentFile() | Returns the string value that was set by the SetRecentFile() method. |
| string | GetRenameSuffix() | Returns the string value that was set by the SetRenameSuffix() method. |
| long | GetSecondsThreshold() | Returns the long integer value that was set by the SetSecondsThreshold method. |
| long | GetSourceThreshold() | Returns the long integer value that was set by the SetSourceThreshold() method. |
| string | GetSpamDirName() | Returns the string value that was set by the SetSpamDirName() method. |
| string | GetSpamPrefix() | Returns the string value that was set by the SetSpamPrefix() method. |
| string | GetSpamSuffix() | Returns the string value that was set by the SetSpamSuffix() method. |
| void | PrintBypassListArray() | Prints to standard output the contents of the private structure array BypassListArray, which is ultimately the entries within the file identified by the GetBypassFile() method. |
| void | PrintNewListArray() | Prints to standard output the contents of the private structure array NewListArray, which is ultimately a list of files and their associated times of arrival that have been processed during the current invocation of the Execute() method. |
| void | PrintRecentListArray() | Prints to standard output the contents of the private structure array RecentListArray, which is ultimately a list of all addresses (and associated processed statistics) that this READACS object has processed within the x-time specified in the SetSecondsThreshold(x) method. |
| void | SetAddrInfoLocator(string) | Sets an email address identifier. The line identified as an email address line will be searched for the first occurrence of the value indicated by the string parameter. Under most conditions this parameter will be set to "@", but may be any desired string value. |
| void | SetAddrLineLocator(string) | Sets an email address line identifier. The mail file will be searched for the first occurrence of the value indicated by the string parameter. Under most conditions this parameter will be set to "From:", but may be any desired string value. |

TABLE C-continued

User Interface Methods Listing

| Return Type | Method | Description |
|---|---|---|
| void | SetBypassFile(string) | Sets the name (including path, if desired) of the file that will contain any email addresses that require special high-volume consideration. The format of the file is:<br>address, tolerance<CrLf><br>where address is the address of special consideration and tolerance is the number of items to allow from this address within the time range set by the SetSecondsThreshold method. |
| void | SetDestinationDirName(string) | Sets the directory path to which non-spam email is moved. This path is required if SetRenameSuffix is not defined; otherwise, it is optional. |
| void | SetExcludeName(string) | Sets a string value for which to search file names in the directory defined in SetMailInDirName. Any file containing the string defined will be excluded from processing and left as-is. |
| void | SetIncludeName(string) | Sets a string value for which to search file names in the directory defined in SetMailInDirName. ONLY files containing the string defined will be processed. |
| void | SetMailInDirName(string) | Sets the directory path containing incoming email files to be processed. |
| void | SetRecentFile(string) | Sets the name (including path, if desired) of the address history. THIS FILE SHOULD NOT BE MODIFIED BY ANY USER OR PROCESS OTHER THAN READACS. The file will be created and maintained by READACS. Be sure to set permissions on this file and directory for read/write. |
| void | SetRenameSuffix(string) | Sets the rename suffix to be added to all non-spam email after it is processed. This name is required if SetDestinationDirName is not defined; otherwise, it is optional. |
| void | SetSecondsThreshold(long) | Sets the number of seconds to remember addresses in history. |
| void | SetSourceThreshold(long) | Sets the maximum number of mail to accept from a particular address within the value set in SetSecondsThreshold before treating it as spam. This threshold may be overridden on an address-by-address basis within the file indicated by the SetBypassFile method. |
| void | SetSpamDirName(string) | The directory into which all email files identified as spam will be moved. This name is required if SetSpamSuffix is not defined; otherwise, it is optional. |
| void | SetSpamPrefix(string) | Sets the rename prefix to be added to all spam email after it is processed. This name is required if SetSpamDirName and SetSpamSuffix are not defined; otherwise, it is optional. If a value is entered, any file name whose prefix matches the value passed in this method will be excluded from processing. |
| void | SetSpamSuffix(string) | Sets the rename suffix to be added to all spam email after it is processed. This name is required if SetSpamDirName and SetSpamPrefix are not defined; otherwise, it is optional. If a value is entered, any file name whose suffix matches the value passed in this method will be excluded from processing. |

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

What is claimed is:

1. A method for automatically detecting unwanted messages in real time in a system that includes a message server for routing incoming message files to a directory, the method comprising the steps of:

accessing said directory and for identifying said message files;
   locating any of an address-of-origin, subject, or other specified criteria within each said message file;
   identifying whether each said message file should be considered spam;
   separating said spam and non-spam message files logically; and
   any of physically moving and renaming said message files in a predetermined fashion;
   wherein said accessing step further comprising the steps of:
      reading a RecentFileList from a RecentFile; and
      loading said RecentFileList into a RecentListArray;
      wherein if a BypassFileList is included, reading said BypassFileList into a BypassArray;
   wherein said locating step further comprising the steps of:
      creating a NewListArray;
      opening said message files;
      extracting message addresses of a sender as defined in any of MailInDirName, AddrLineLocator, and AddrInfoLocator fields;
      loading said NewListArray with new message sender addresses and associated file names;
      setting an arrival time for all records in said NewListArray;
      combining said NewListArray into said RecentListArray;
      marking new records as IsNew=True; and
      sorting said RecentListArray by message sender addresses;
   wherein said identifying step further comprising the steps of:
      determining the age of a message sender address based upon a SecondsThreshold when a message sender address is retrieved from said RecentListArray;
      if said message file is older than said threshold, marking said message file as IsExpired=True by Seconds Threshold;
      determining whether said message sender address occurs more often than a SourceThreshold allows;
      optionally, if yes, examining said message sender address to determine if it is to be passed anyway because it is identified in said BypassArray; and
      marking said message file as IsSpam=True if said message file exceeds said SourceThreshold, and said SecondThreshold has not timed out, and optionally said message file is not listed in said BypassArray.

2. A method for automatically detecting unwanted messages in real time in a system that includes a message server for routing incoming message files to a directory, the method comprising the steps of:

receiving a message file at a host system;
   routing said message file to said directory;
   writing said message file with a prefix and/or suffix that allows it to be identified as a new message;
   identifying all message files in said directory that are spam; and
   any of renaming and moving said message files;
   wherein said method requires minimum implementation parameters which comprise:
      a path and/or name of a recent file;
      a path and/or name of a bypass file;
      an incoming mail directory;
      a directory and/or file name suffix for non-spam mail;
      a directory and/or file name suffix for spam mail;
      a number of seconds to accumulate information before clearing it;
      a number of occurrences of any one address to allow within a value; and
      a string for which to search within each file processed to determine if said string should contain an address;
      wherein only a first occurrence of a locator within a file is evaluated.

3. A method for automatically detecting unwanted messages in real time in a system that includes a message server for routing incoming message files to a directory, the method comprising the steps of:

receiving a message file at a host system;
   routing said message file to said directory;
   writing said message file with a prefix and/or suffix that allows it to be identified as a new message;
   identifying all message files in said directory that are spam; and
   any of renaming and moving said message files;
   said method implementation parameters optionally comprising:
      partial file names to be excluded from processing; wherein any file including a specific string specified is excluded from processing;
      partial file names to be included in processing; wherein only files including a string specified are processed;
      a suffix for processed non-spam files (SetRenameSuffix); only optional if SetDestinationDirName is defined;
      a destination directory path for non-spam files;
      a suffix for processed spam files;
      a destination directory path for spam files; and
      a string defining what should be considered an address within a line previously identified.

* * * * *